US008578477B1

(12) United States Patent
Lin et al.

(10) Patent No.: US 8,578,477 B1
(45) Date of Patent: Nov. 5, 2013

(54) SECURE COMPUTER SYSTEM INTEGRITY CHECK

(75) Inventors: Yichin Lin, Taipei (TW); Peng-Yuan Yueh, Taipei (TW); Yu-Heng Liu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1465 days.

(21) Appl. No.: 11/729,147

(22) Filed: Mar. 28, 2007

(51) Int. Cl.
G06F 21/00 (2013.01)
(52) U.S. Cl.
USPC .............................................. 726/21; 726/22
(58) Field of Classification Search
USPC ...................................................... 726/21–22
See application file for complete search history.

(56) References Cited

U.S. PATENT DOCUMENTS

| 6,591,362 | B1 * | 7/2003 | Li ..................................... 713/1 |
| 6,647,400 | B1 | 11/2003 | Moran |
| 6,826,697 | B1 | 11/2004 | Moran |
| 6,996,843 | B1 | 2/2006 | Moran |
| 7,007,301 | B2 | 2/2006 | Crosbie et al. |
| 7,032,114 | B1 | 4/2006 | Moran |
| 2005/0204205 | A1 | 9/2005 | Ring et al. |
| 2006/0005015 | A1 * | 1/2006 | Durham et al. ............... 713/164 |
| 2008/0134321 | A1 * | 6/2008 | Rajagopal et al. .............. 726/21 |
| 2008/0163212 | A1 * | 7/2008 | Zimmer et al. ................ 718/100 |

OTHER PUBLICATIONS

Application programming interface (API) from Wikipedia, the free encyclopedia; Jul. 2006, pp. 1-3 [retrieved on Aug. 14, 2006]. Retrieved from the internet: <http://en.wikipedia.org/wiki/Application_programming_interface>.
NtDeviceIoControlFile Function, 2006 Microsoft Corporation, pp. 1-3 (retrieved on Aug. 15, 2006. Retrieved from the internet: <http://msdn.microsoft.com/library/en-us/winui/winui/windowsuserinterface/lowlevelclientsupport/misc/ntdeviceiocontrolfile,asp>.
DeviceIoControl, 2006 Microsoft Corporation, pp. 1-4 (retrieved on Aug. 15, 2006. Retrieved from the internet: <http://msdn.microsoft.com/library/en-us/devio/base/deviceiocontrol.asp?frame=true>.
NtCreateFile, 2006 Microsoft Corporation, pp. 1-8 (retrieved on Aug. 14, 2006. Retrieved from the internet: <http://msdn.microsoft.com/library/default.asp?url=/library/en-us/devnotes/winprog/ntcreatefile.asp>.
James Butler and Sherri Sparks "Windows rootkits of 2005, part one" Nov. 4, 2005, pp. 1-9 (retrieved on Aug. 14, 2006. Retrieved from the internet: <http://www.securityfocus.com/infocus/1850>.

(Continued)

*Primary Examiner* — Ashok Patel
*Assistant Examiner* — Tracy Mangialaschi
(74) *Attorney, Agent, or Firm* — Okamoto & Benedicto LLP

(57) ABSTRACT

The integrity of a computer may be checked by issuing a command to read data from a hardware component of the computer and retrieving the data from a data transfer buffer. The command may be sent to a secure driver that places the central processing unit (CPU) of the computer in system management mode to trigger execution of a system management interrupt (SMI) handler. The SMI handler may read the data from the hardware component, encrypt the data, and place the encrypted data in the data transfer buffer. A system integrity check application program may read the encrypted data to determine presence of malicious code based on the data. For example, the application program may infer presence of malicious code when the encrypted data does not conform to a particular encryption algorithm or when the data does not appear in the data transfer buffer.

12 Claims, 3 Drawing Sheets

(56) References Cited

OTHER PUBLICATIONS

James Butler and Sherri Sparks "Windows rootkits of 2005, part two" Nov. 17, 2005, pp. 1-11 (retrieved on Aug. 14, 2006. Retrieved from the internet: <http://www.securityfocus.com/infocus/1851>.

James Butler and Sherri Sparks "Windows rootkits of 2005, part three" Jan. 5, 2006, pp. 1-10 (retrieved on Aug. 14, 2006. Retrieved from the internet: <http://www.securityfocus.com/infocus/1854>.

Chkrootkit—locally checks for signs of a rootkit, Oct. 2006, 2 sheets, webpage [online] [retrieved on Jan. 29, 2007]. Retrieved from the internet: <http://www.chkrootkit.org/>.

Bryce Cogswell, et al. "RootkitRevealer v1.71" Nov. 1, 2006, pp. 1-5 (retrieved on Jan. 29, 2007. Retrieved from the internet: <http://www.microsoft.com/technet/sysinternals/Security/RootkitRevealer.mspx>.

Slashdot—SysInternals Releases RootkitRevealer, posted Feb. 23, 2005 by CmdrTaco, 25 sheets, [retrieved on Jan. 29, 2007]. Retrieved from the internet: <http://it.slashdot.org/article.pl?sid=05/02/23/1353258&from=rss>.

System Management Mode from Wikipedia, the free encyclopedia; Feb. 2007, pp. 1-2 [retrieved on Mar. 14, 2007]. Retrieved from the internet: <http://en.wikipedia.org/wiki/System_Management_Mode>.

Blue Pill (malware) from Wikipedia, the free encyclopedia; Mar. 2007, p. 1 [retrieved on Mar. 16, 2007]. Retrieved from the internet: <http://en.wikipedia.org/wiki/Blue_Pill_(malware)>.

* cited by examiner

SECURE COMPUTER SYSTEM INTEGRITY CHECK

BACKGROUND OF THE INVENTION

1. Field of the Invention

The present invention relates generally to computer system security, and more particularly but not exclusively to methods and apparatus for checking the system integrity of a computer.

2. Description of the Background Art

Computer viruses, worms, Trojans, rootkits, and spyware are examples of malicious codes that have plagued computer systems throughout the world. In the past, traditional antivirus techniques allow for detection and removal of malicious codes. However, malicious codes have become very sophisticated to the point where they can infect not just application programs but the operating system kernel and low level functionalities as well. New breeds of malicious codes can thus interfere with the operation of conventional antivirus programs, preventing malicious codes from being detected and removed. What is needed is a way to detect malicious codes, especially those that can affect low level operations of a computer.

SUMMARY

In one embodiment, the integrity of a computer is checked by issuing a command to read data from a hardware component of the computer and retrieving the data from a data transfer buffer. The command may be sent to a secure driver that places the central processing unit (CPU) of the computer in system management mode to trigger execution of a system management interrupt (SMI) handler. The SMI handler may read the data from the hardware component, encrypt the data, and place the encrypted data in the data transfer buffer. A system integrity check application program may read the encrypted data to determine presence of malicious code based on the data. For example, the application program may infer presence of malicious code when the encrypted data does not conform to a particular encryption algorithm or when the data does not appear in the data transfer buffer.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
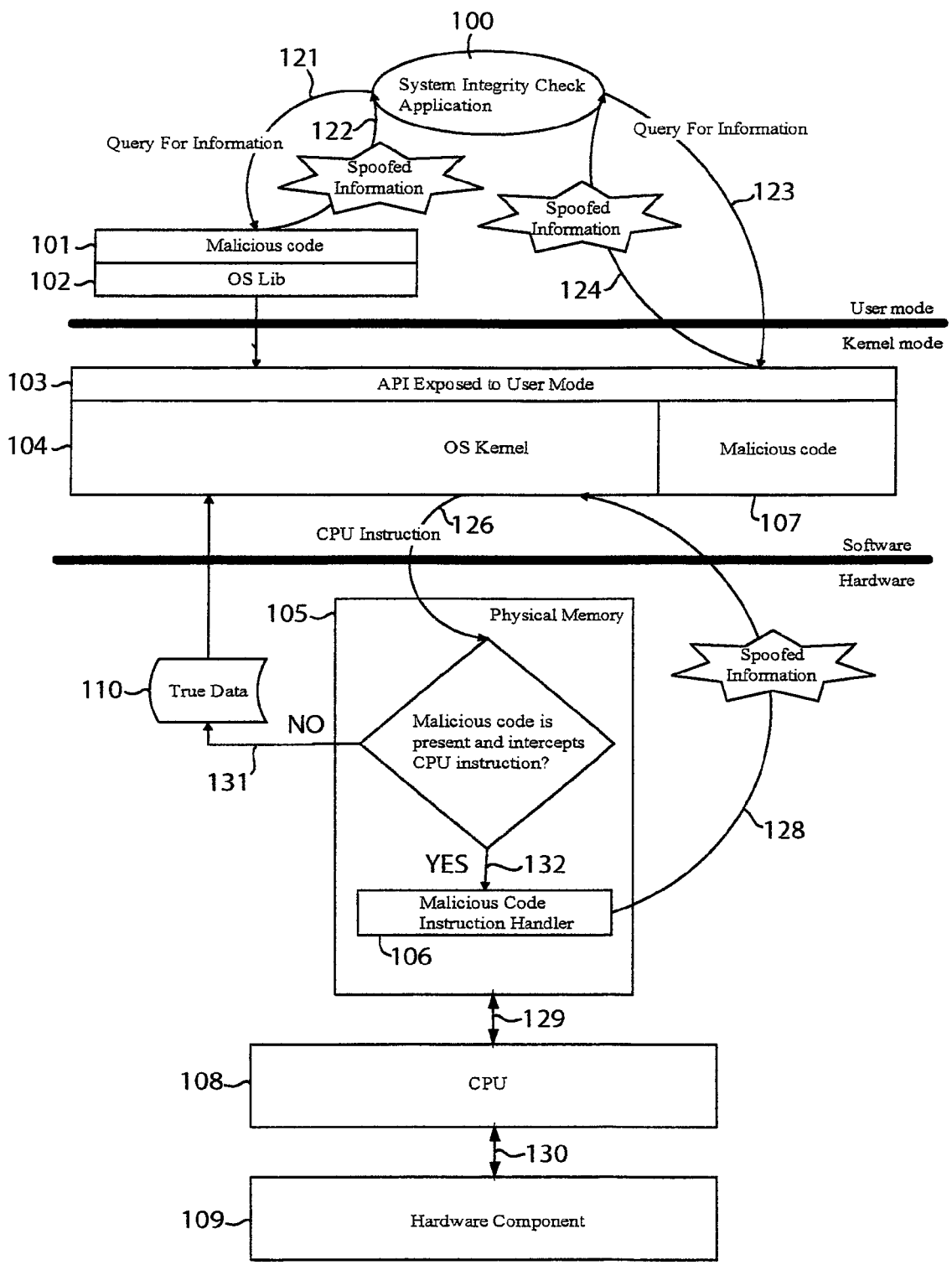
FIG. 1 shows a flow diagram illustrating how malicious codes may interfere with the operation of a system integrity check application in obtaining information from a hardware component of a computer.

FIG. 1 shows a flow diagram illustrating how malicious codes may interfere with the operation of a system integrity check application 100 in obtaining information from one or more hardware components 109. The hardware components 109 may comprise central processing unit (CPU) registers, data storage devices, chipsets, and other hardware components of the computer. In the example of FIG. 1, the application 100 issues a query for information to read data from a hardware component 109 (arrow 121). The application 100 sends the query by making a call to an operating system library 102. However, malicious code 101 intercepts the call and returns false information, also referred to as "spoofed information," to the application 100 (arrow 122). The malicious code 101 may comprise a virus that infects computers by dynamic link library (DLL) injection, for example.

Another way of issuing a query for information to read data from the hardware component 109 is to utilize an application programming interface (API) 103 to make a system call (arrow 123). In this approach, the application 100 invokes the system call to perform a low level operation to read data from the hardware component 109. However, malicious code 107 has infected the operating system kernel 104. This allows the malicious code 107, which may be a rootkit driver, to intercept the system call and return false information to the application 100 (arrow 124).

Even without the presence of malicious code 101 intercepting calls to the operating system library 102 in user mode or the malicious code 107 intercepting calls to operating system services or drivers in kernel mode, some other malicious codes may still interfere with the low level operation of reading data from the hardware component 109. In the example of FIG. 1, the operating system kernel 104 may initiate execution of a CPU instruction to read data from the hardware component 109 in response to a query for information from the application 100 (arrow 126). In the absence of malicious code, the CPU 108 will read the instruction from the physical main memory 105 (arrow 129), retrieve the requested data from the hardware component 109 (arrow 130), and place the requested data in the memory 105 for reading by the operating system kernel 104 (arrow 131). The requested data has been labeled as "true data" 110 to indicate that in this case the data has not been falsified by malicious code. However, a malicious code instruction handler 106, such as the so-called "Blue Pill" code, may be present to intercept the CPU instruction from the operating system kernel 104 (arrow 132) and return false information to the operating system kernel 104 (arrow 128).

As can be appreciated from the foregoing, the application 100 cannot reliably obtain data from a hardware component 109 given the possible proliferation of sophisticated malicious codes at different levels of the computer. Malicious codes may return false information to hide their presence from the application 100.

Figure 2:
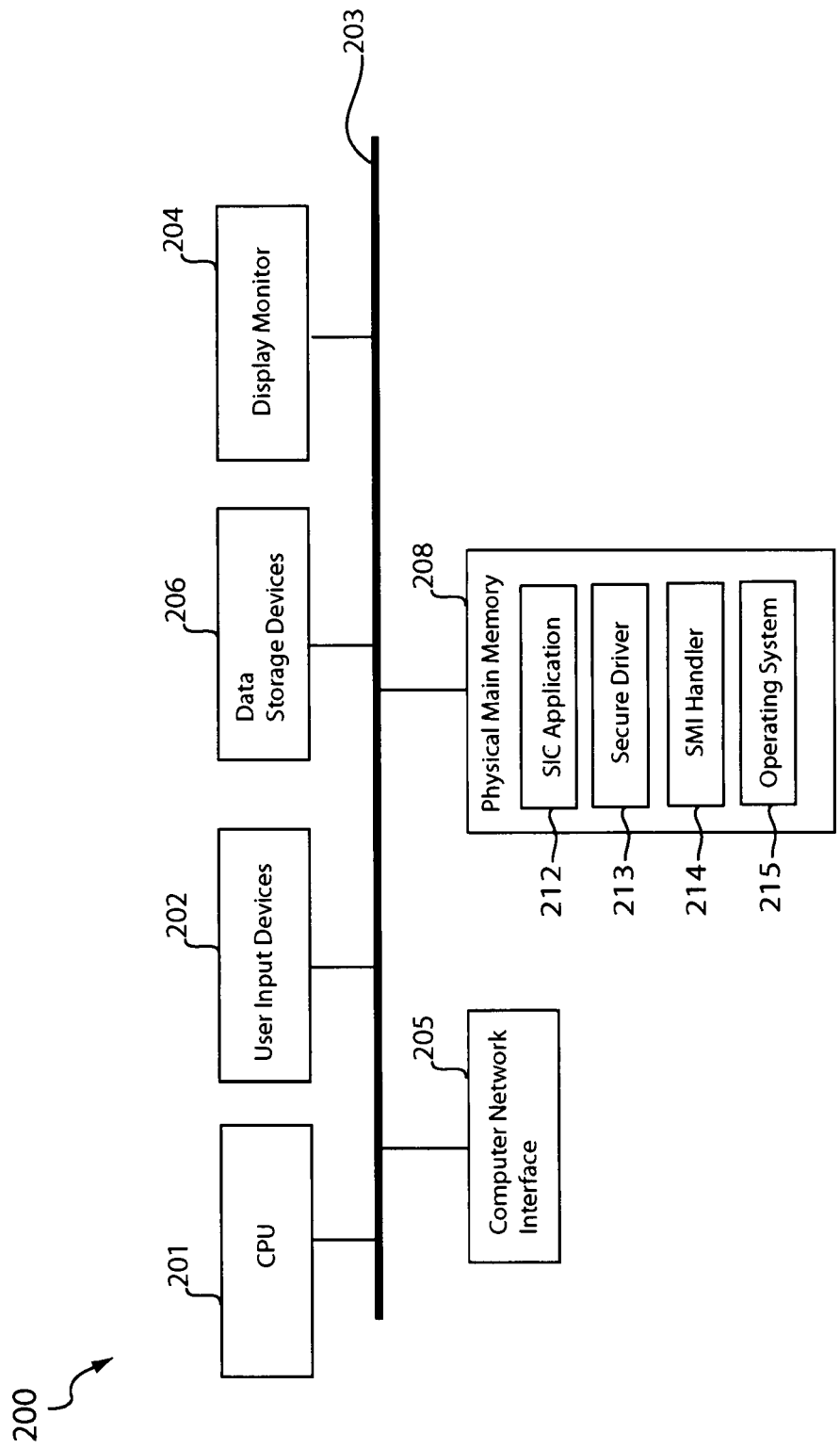
FIG. 2 shows a schematic diagram of a computer in accordance with an embodiment of the present invention.

Referring now to FIG. 2, there is shown a schematic diagram of a computer 200 in accordance with an embodiment of the present invention. The computer 200 may have less or more components to meet the needs of a particular application. The computer 200 may include a CPU 201, such as those with a system management mode. System management mode allows for suspension of normal execution, including the operating system, to allow a handler to execute in high-privilege mode. When system management mode is entered, program execution passes to a handler having a memory location designated by the computer's firmware, typically its BIOS (basic input/output system), during system boot. System management mode is available in the Intel® 386SL and later microprocessors, for example.

As shown in FIG. 2, the computer 200 may include one or more user input devices 202 (e.g., keyboard, mouse), one or more data storage devices 206 (e.g., hard drive, optical disk, USB memory), a display monitor 204 (e.g., LCD, flat panel monitor, CRT), a computer network interface 205 (e.g., network adapter, modem), a physical main memory 208 (e.g., RAM), and one or more buses 203 coupling its various components. In the example of FIG. 2, the memory 208 includes software (i.e., computer-readable program code) components namely, a system integrity check application 212, a secure driver 213, a system management interrupt (SMI) handler 214, and an operating system 215. In one embodiment, the operating system 215 comprises the Microsoft Windows™ operating system.

The system integrity check application 212 may comprise computer-readable program code for detecting presence of malicious code and obtaining data from hardware components (labeled as 370 in FIG. 3) of the computer 200. Examples of these hardware components include CPU registers, data storage devices, chipsets, registers of plug-in cards, and so on. The application 212 may be an antivirus program. As will be more apparent below, the application 212 in conjunction with the secure driver 213 and the SMI handler 214 allow for reliably obtaining data from a hardware component or, in the event malicious code interferes with its operation, detection of presence of the malicious code. Once malicious code has been identified, the application 212 may alert the user or a program. In that case, the computer 200 may be restored to a state prior to the malicious code infection, for example.

The application 212 may be configured to send a command to the secure driver 213 to obtain requested data from or write data to a hardware component. The application 212 may expect to retrieve requested data from an encrypted buffer in the memory 208 after a predetermined timeout period. Encrypting the requested data advantageously allows the application 212 to detect false information, which in turn alerts the application 212 to the presence of malicious code. For example, the application 212 may compare data from the encrypted buffer to patterns or signatures of false information returned by known malicious codes. Even if malicious code decides to intercept calls without returning false information, the application 212 may infer presence of the malicious code if the application 212 cannot obtain the requested data within the timeout period. For example, the application 212 may note the contents of the encrypted buffer before sending the command to obtain the requested data. If the contents of the encrypted buffer have not changed within the timeout period, the application 212 may infer presence of malicious code interfering with execution of the command.

The secure driver 213 may comprise computer-readable program code for interfacing with the application 212 and triggering execution of the handler 214. The secure driver 213 may operate in kernel mode as a registered operating system driver. As can be appreciated, this allows the application 212 to call the secure driver 213 without having to invoke an API that comes and is standard with the operating system 215. Operating system API's are generally vulnerable to malicious code infection because they are widely known and distributed with copies of the operating system. The secure driver 213 may prevent malicious code interference by restricting its communications only with the application 212. The secure driver 213 is also not widely known as it does not come with the operating system. Furthermore, as explained above, even if communications between the secure driver 213 and the application 212 are intercepted by malicious code, the malicious code will still have no way of returning false information that will be believable to the application 212 due to the use of an encrypted buffer.

In one embodiment, the secure driver 213 triggers the CPU 201 to enter system management mode by writing to an I/O port, also referred to as "SMI port," reserved for this purpose. For example, the secure driver 213 may trigger system management mode by issuing an OUT instruction to an SMI port.

The secure driver 213 may pass parameters (e.g., read/write commands, hardware component to write to/read from) to the SMI handler 214 by writing to a predefined memory location designated by the BIOS or other firmware of the computer 200. The parameters are preferably encrypted to prevent tampering by malicious codes. Preferably, all data transmission between the BIOS and the secure driver 213 are encrypted, checksummed, and acknowledged to prevent tampering.

In one embodiment, the secure driver 213 includes initialization code that first checks whether the BIOS of the computer 200 supports secure system integrity check by searching a range of physical memory locations for an encrypted signature followed by the address of predefined memory locations to be used as encrypted data transfer buffer. The encrypted signature prevents malicious codes from fooling the secure driver 213 that the BIOS does not support secure system integrity check even when it does. The secure driver 213 preferably alerts the user, e.g., using a message box, when it fails to load because of no BIOS support. This advantageously allows the user to infer presence of malicious code if she knows her computer has the secure system integrity check feature.

The SMI handler 214 may comprise computer-readable program code for reading data from or writing data to hardware components of the computer 200 during system management mode. In one embodiment, the SMI handler 214 is located in a memory location dictated by the BIOS or other firmware of the computer 200. The SMI handler 214 may be configured to execute when the secure driver 213 initiates system management mode, to read data from a hardware component, to encrypt the read data, and to store the read data in the encrypted buffer in the memory 208. The SMI handler 214 may also be configured to write data to a hardware component.

Figure 3:
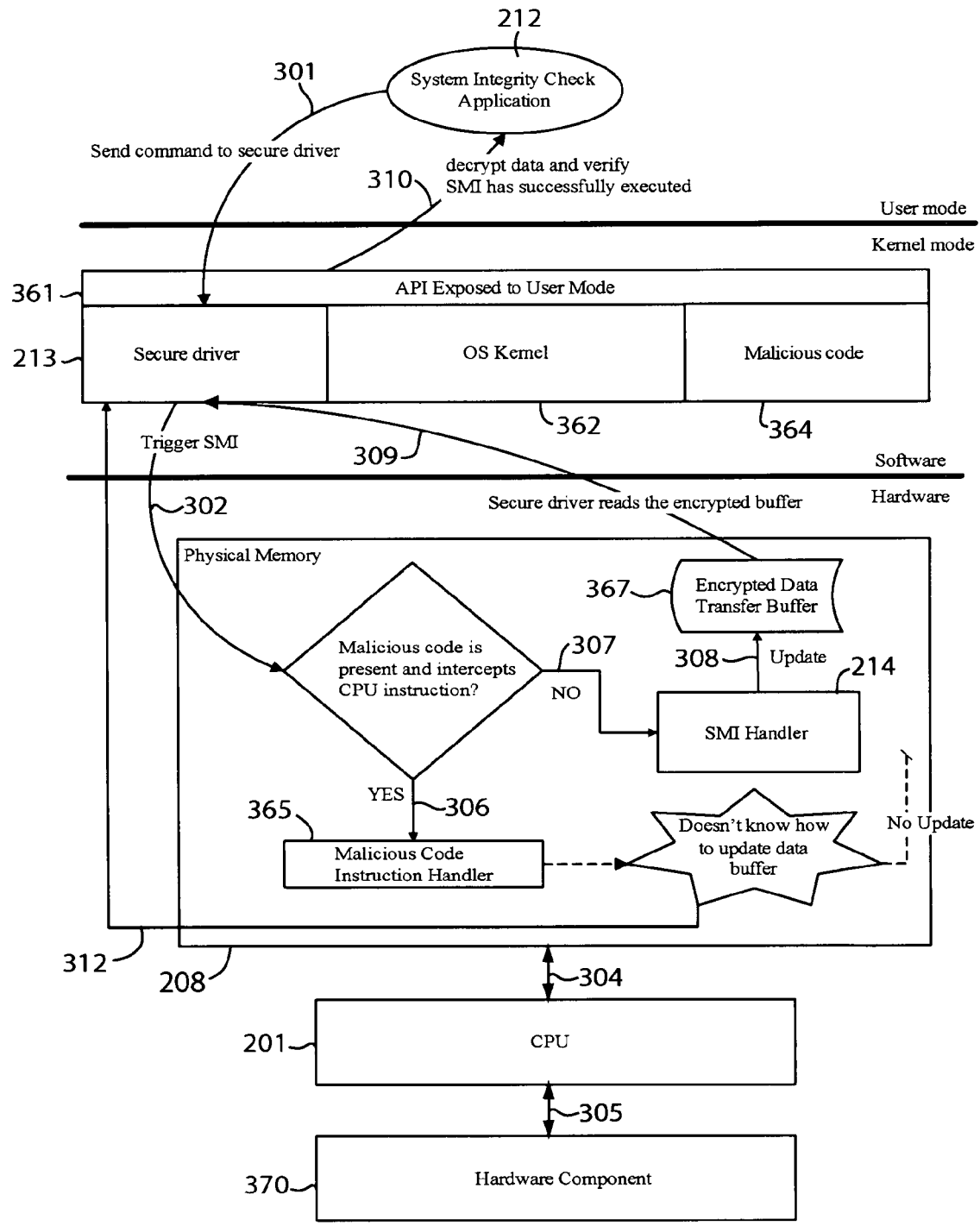
FIG. 3 shows a flow diagram illustrating the operation of components of the computer of FIG. 2 in accordance with an embodiment of the present invention.

FIG. 3 shows a flow diagram illustrating the operation of components of the computer 200 in accordance with an embodiment of the present invention. In the example of FIG. 3, the application 212 tries to read data from one or more hardware components 370. The hardware components 370 may comprise central processing unit (CPU) registers, data storage devices, chipsets, and other hardware components of the computer 200, for example.

In the example of FIG. 3, the application 212 sends a read command to the secure driver 213 to read data from a hardware component 370 (arrow 301). As shown in FIG. 3, the read command to the secure driver 213 does not involve use of an API 361 that comes standard with the operating system. This prevents the malicious code 364 (e.g., rootkit driver) that infected the operating system kernel 362 from intercepting the read command. The secure driver 213 receives the read command from the application 212 and accordingly initiates system management mode by triggering the system management interrupt (arrow 302). In one embodiment, the secure driver 213 triggers the system management interrupt by issuing a CPU instruction to write to a designated system management interrupt port.

In the case where there is no malicious code that intercepts CPU instructions, the CPU 201 enters system management mode and transfers execution to the SMI handler 214 (arrow 307). Accordingly, the SMI handler 214 issues a CPU instruction (arrow 304) to read data from the hardware component 370 (arrow 305). The SMI handler 214 encrypts the read data using an encryption/decryption algorithm known to both the application 212 and the SMI handler 214 and stores the encrypted read data in the encrypted data transfer buffer 367 (arrow 308). The secure driver 213 reads the encrypted read data from the encrypted data transfer buffer 367 (arrow 309) and passes the encrypted read data to the application 212 (arrow 310). The application 212 decrypts and analyzes the encrypted read data to determine if the SMI handler 214, and thus the read command, has successfully executed. For example, the application 212 may deem the read data as false if it is unintelligible (e.g., due to the malicious code not knowing the encryption/decryption algorithm) or does not contain a predetermined verification code. The application 212 may infer presence of malicious code in the computer 200 when the data read from the buffer 367 comprises false information or when the contents of the buffer 367 have not changed after one or more attempts to send a read command to the secure driver 213. In that case, the application 212 may alert the user or an antivirus program to the presence of the malicious code.

In the case where malicious code 365 is present in the memory 208, the malicious code 365 may intercept the CPU instruction from the secure driver 213 (arrow 306). In that case, the malicious code 365 may try to return false information to the secure driver 213 (arrow 312). However, since the malicious code 365 does not know how to update the encrypted data transfer buffer 367 because it does not know where the buffer 367 is or is unfamiliar with the encryption/decryption algorithm employed by the SMI handler 214, the malicious code 365 will fail to correctly update the buffer 367. This results in unsuccessful execution of the SMI handler 214, which is detected by the application 212.

As can be appreciated, the above described embodiments allow for a system integrity check that has different levels of protection against interference by malicious codes. The described embodiments allow for detection of malicious codes, even those that operate at a level low enough to intercept CPU instructions that read data from hardware components.

A secure computer system integrity check has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of performing a system integrity check of a computer, the method to be performed by the computer and comprising:
   determining whether a basic input/output system (BIOS) of the computer supports the system integrity check and alerting a user of the computer when the BIOS does not support the system integrity check;
   sending a command from a system integrity check application program operating in user mode to a secure driver operating in kernel mode, the command being to read requested data from a hardware component of the computer;
   in response to receiving the command in the secure driver, triggering a system management interrupt (SMI) to transfer program execution to an SMI handler, the location of the SMI handler in memory being dictated by the BIOS;
   using the SMI handler to read the requested data from the hardware component of the computer, to encrypt the requested data, and to store the encrypted requested data in a data transfer buffer;
   the secure driver reading the encrypted requested data from the data transfer buffer; and
   the system integrity check application program receiving the encrypted requested data from the secure driver, decrypting the encrypted requested data in user mode, and determining if the SMI handler successfully executed by analyzing the requested data in user mode for a predetermined verification code.

2. The method of claim 1 wherein the hardware component comprises a register.

3. The method of claim 1 wherein the secure driver triggers the SMI by writing an OUT instruction to an I/O port.

4. The method of claim 1 wherein the system integrity check application program infers presence of malicious code in the computer when contents of the data transfer buffer have not changed after sending the command to the secure driver.

5. The method of claim 1 wherein the system integrity check application program infers presence of malicious code in the computer when contents of the data transfer buffer are not encrypted per a designated encryption/decryption algorithm.

6. The method of claim 1 wherein the command reaches the secure driver without having to use an application programming interface (API) of an operating system.

7. A computer with a memory and a central processing unit (CPU) to execute computer-readable program code in the memory, the memory comprising:
   a system integrity check application comprising computer-readable program code configured to be executed by the CPU in user mode to send a read command to obtain data from a hardware component of the computer, to decrypt the data received from the secure driver, and to determine whether a system management interrupt (SMI) handler successfully executed by looking for a predetermined verification code in the data received from the secure driver;
   the secure driver comprising computer-readable program code configured to be executed by the CPU in kernel mode to receive the read command, to initiate system management mode in response to the read command to be able to receive the data from a data transfer buffer, and to provide the data to the system integrity check application program, the system management mode suspending execution of current CPU operations to initiate execution of the SMI handler, the location of the SMI handler being dictated by a basic input/output system (BIOS) of the computer, wherein the secure driver includes initialization code that checks whether the BIOS computer supports a secure system integrity check and alerts a user of the computer when the BIOS does not support the secure system integrity check;

wherein the SMI handler comprises computer-readable program code configured to be executed by the CPU upon initiation of the system management mode, the SMI handler being configured to read the data from the hardware component, encrypt the data, and store the data in the data transfer buffer for reading by the secure driver.

8. The computer of claim 7 wherein the secure driver initiates system management mode by issuing an OUT instruction to an SMI I/O port.

9. The computer of claim 7 wherein the hardware component comprises a register.

10. The computer of claim 7 wherein the system integrity check application program infers presence of malicious code in the computer when contents of the data transfer buffer have not changed after sending the read command to the secure driver.

11. The method of claim 7 wherein the system integrity check application infers presence of malicious code in the computer when the contents of the data transfer buffer are not encrypted per a designated encryption/decryption algorithm.

12. The method of claim 7 wherein the read command reaches the secure driver without having to use an application programming interface (API) of an operating system.

* * * * *